United States Patent Office 3,187,263
Patented June 1, 1965

3,187,263
SWEEP SIGNAL GENERATING CIRCUIT STABILIZED AGAINST NOISE AND COMPONENT DRIFT PROBLEMS

Milton Rosenstein, Bayside, N.Y., assignor to Hazeltine Research, Inc., Chicago, Ill., a corporation of Illinois
Filed Aug. 24, 1960, Ser. No. 51,708
10 Claims. (Cl. 328—185)

Figure 1:
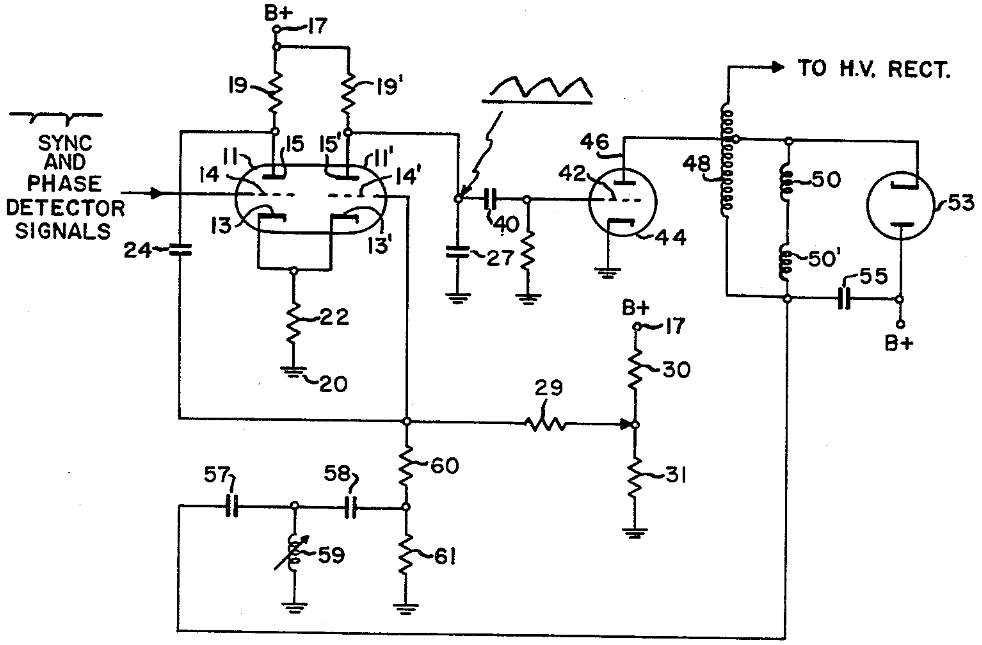

This invention relates to oscillator circuits of the multivibrator and blocking oscillator type and, more particularly, to a circuit for increasing the stability of these oscillator circuits in television receivers.

This application is a continuation-in-part of application Serial No. 829,294, filed July 24, 1959, now abandoned.

In television receivers, it is conventional to maintain the receiver sweep circuits in synchronism with the transmitter picture by means of received synchronizing pulses which are broadcast by the television transmitter. If the oscillators controlling the sweep circuits of the receiver are allowed to free-run, or to run at frequencies other than the frequency of the synchronizing pulses, or if the oscillators are triggered off by other signals, the picture presented on the receiver display device will be out of synchronism with the transmitted picture. This is manifested on the display device, when synchronism of the horizontal sweep circuit is lost, by a "tearing-out" of the picture in the horizontal direction or, when vertical synchronism is lost, by the "rolling" of the picture in a vertical direction.

One familiar type of television sweep circuit utilizes a multivibrator or blocking oscillator which operates in conjunction with suitable circuits to produce the sawtooth wave necessary to operate the television receiver deflection circuits. The multivibrator and blocking oscillators of a television receiver are designed so as to be synchronized by the transmitted sync pulses.

The stability of the output frequency produced by multivibrator and blocking oscillator circuits is affected by many factors, for example, changes of circuit component values, changes of the oscillator tube characteristics, supply voltage changes, etc. These circuits may also be undesirably triggered off by noise pulses which occur at times other than the synchronizing pulses.

As pointed out above, when the oscillators of the sweep circuits operate at frequencies other than the frequencies of the synchronizing pulses of the transmitted picture, the picture displayed by the receiver display device is not in synchronism with the transmitted picture and the picture "tears-out" or "rolls."

One of the factors which determines the stability of multivibrator and blocking oscillator circuits is the slope of the grid discharge curve as it crosses the cutoff characteristic line of the tube. If the cutoff characteristic curve of the tube is plotted against time and the grid discharge curve is plotted against time, greater stability against component drift, supply voltage changes, etc. is achieved when the two curves approach a perpendicular relationship to each other at the point of crossing. Also, by steepening the grid discharge curve and making it more nearly perpendicular to the cutoff characteristic of the tube at the point of crossing, the oscillator circuit is made more stable as against received noise pulses.

The present invention is directed to multivibrator and blocking oscillators of greater stability which are also less susceptible to noise pulses. A more stable oscillator is provided in the present invention by shaping the grid discharge wave form which controls the oscillator, so that the grid discharge wave form crosses the characteristic cutoff curve of the tube substantially at a right angle.

It is, therefore, an object of this invention to provide improved stability multivibrators and blocking oscillators.

Another object of this invention is to provide sweep circuits of improved stability for television receivers.

Still another object of this invention is to provide multivibrator and the blocking oscillator type circuits whose stability is increased by shaping the grid discharge wave form which controls the oscillator.

A further object of this invention is to provide multivibrator and blocking oscillators of improved stability for a television receiver wherein the voltage developed across the damper tube boost capacitor is used to shape the grid discharge wave of the oscillator.

In accordance with the invention, a stable sweep-signal generating circuit in a television receiver comprises a sawtooth oscillator to be controlled by a predetermined portion of a control signal and a damper circuit including a boost capacitor across which is developed a signal in the form of a repetitive series of parabolic waves. The circuit also comprises means for modifying the control signal to reduce the possibility that the oscillator will be undesirably controlled by a portion of the control signal other than the predetermined portion by supplying the boost capacitor signal to the oscillator for improving the stability of the oscillator against noise and component drift.

For a better understanding of the present invention, together with other and further objects thereof, reference is had to the following description, taken in connection with the accompanying drawings, and its scope will be pointed out in the appended claims.

Figure 3:
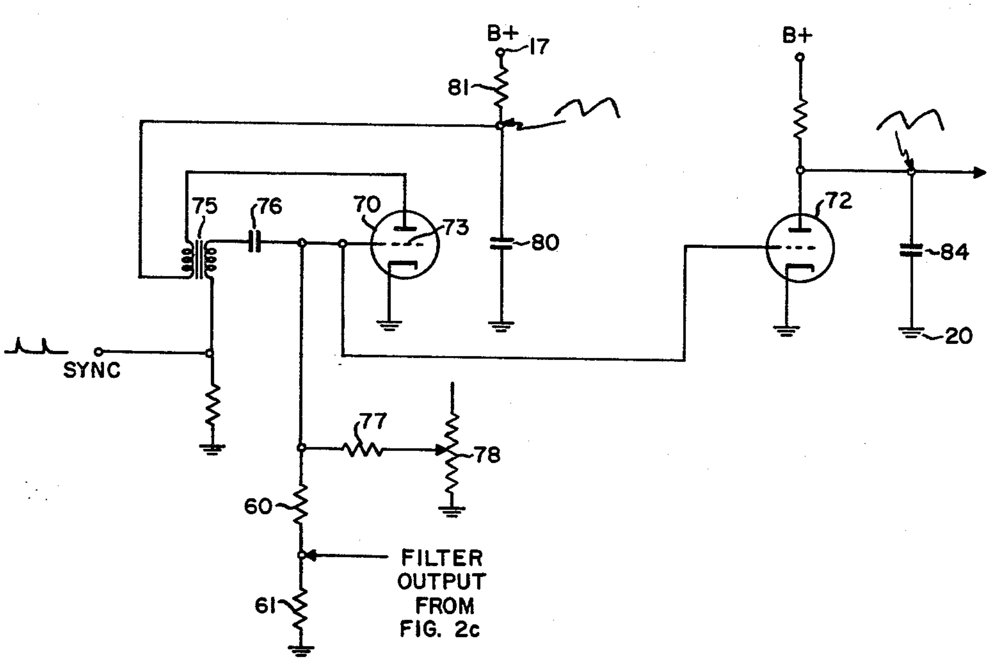

Referring to the drawing:

FIG. 1 is a schematic diagram of a sweep circuit for a television receiver utilizing the principles of the present invention;

FIGS. 2*a*–2*d* show voltage wave forms present at various points of the sweep circuit of FIG. 1;

FIG. 3 is a schematic diagram of another embodiment of the invention, and

Figure 3A:
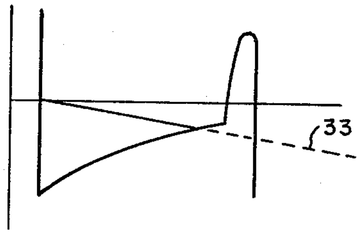
Figure 3B:
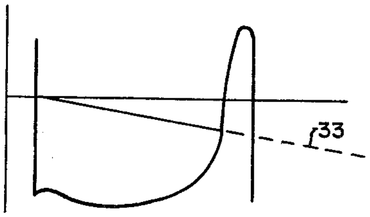

FIGS. 3*a*–3*b* show voltage wave forms present at various points of the circuit of FIG. 3.

Referring to FIG. 1, an embodiment of the invention as used with a sweep circuit which is controlled by a cathode-coupled multivibrator is shown. The multivibrator is formed by two triode vacuum tubes 11 and 11', which are illustratively shown as constructed within a single envelope. The vacuum tubes 11 and 11' have respective cathode, grid, and anode electrodes 13–13', 14–14', and 15–15'. The anode electrodes 15 and 15' are connected to a suitable source of B+ potential 17 through respective resistors 19 and 19'. The cathode electrodes 13 and 13' are coupled to a source of reference potential, here shown as ground 20, through a common cathode resistor 22. A feedback path is provided from the anode electrode 15 of tube 11 to the grid electrode 14′ of tube 11′ by means of a capacitor 24. A capacitor 27, across which the sawtooth wave for the deflection circuit is developed, is connected between anode 15′ of tube 11′ and ground 20.

It is the purpose of the multivibrator circuit formed by tubes 11 and 11′ to produce a sawtooth wave. This is accomplished by alternately charging and discharging the capacitor 27, which is located in the plate circuit of the tube 11′. The multivibrator circuit of FIG. 1 functions in the well-known manner, wherein feedback action between the two tubes 11 and 11′ alternately permits one tube to conduct and then the other. When tube 11′ is not conducting (cutoff), capacitor 27 charges through resistor 19′ towards the B+ potential, thereby generating the rising or trace portion of the sawtooth wave. When tube 11′ conducts, the capacitor 27 discharges rapidly through the low resistance presented by the conducting tube, thereby producing the rapidly decreasing or retrace portion of the sawtooth wave. Since the resistance of the conducting tube 11′ is substantially lower than the resistance of the resistor 19′, the discharge time of capacitor 27 is more rapid than the charge time, thereby accounting for the fast retrace time and slow trace time.

In order to explain the operation of the multivibrator circuit, consider that the first tube 11 supplies a feedback signal of the proper polarity to drive the tube 11′ grid 14′ further positive when the grid voltage is rising, thereby making it conduct harder, and further negative when the grid voltage of tube 11′ is decreasing, thereby driving it further into cutoff.

To explain the operating cycle of the multivibrator, consider that grid 14′ is swinging positive. This means that tube 11′ is drawing more plate current. The rise in plate current appears across the common cathode resistor 22 and applies a higher negative bias to tube 11, thereby increasing the positive voltage on its cathode. The increase of positive voltage on the cathode of tube 11 drives tube 11 towards cutoff, thereby reducing its plate current flow and increasing its plate voltage towards the B+ potential 17. The increase of the plate voltage of tube 11 is transmitted through the capacitor 24 to the grid 14′ of tube 11′ adding to the original increase in the grid voltage of tube 11′.

When the feedback from tube 11 to tube 11′ occurs rapidly, it drives tube 11 towards cutoff and the grid 14′ of tube 11′ to the saturation point, where a further positive increase of the potential on grid 14′ no longer causes any further increase in the plate current of tube 11′. At this instant, no further feedback occurs and the voltage on grid 14′ of tube 11′ begins to fall off as capacitor 24 discharges through a resistor network formed by resistors 29, 30, 31, 60, and 61.

This reverse feedback cycle continues until tube 11 starts to conduct, thereby causing a drop in the voltage present at its anode electrode 15. This drop in voltage at the anode 15 is transmitted through capacitor 24, driving tube 11′ towards cutoff. This feedback cycle continues until the grid 14′ of tube 11′ is driven way beyond cutoff by the drop in the plate voltage of tube 11. When this occurs, tube 11′ is cut off and tube 11 is conducting.

This latter condition of tube 11′ being cut off and tube 11 conducting is maintained until capacitor 24 has had time to charge through the resistors 29, 30, 31, 60, and 61 to a point where the voltage on the grid 14′ of tube 11′ is such that tube 11′ again starts to conduct. Since the grid voltage on grid 14′ has been going in a positive direction to reach the conduction point for tube 11′, a new feedback cycle begins which drives the grid 14′ of tube 11′ positive and the grid 14 of tube 11 negative, starting the cycle all over again.

During the interval that tube 11′ is cut off, capacitor 27 charges through resistor 19′ towards the B+ potential 17. When tube 11′ conducts, capacitor 27 is rapidly discharged through the low resistance path presented by the tube 11′. Therefore, a sawtooth wave form is produced across the capacitor 27 whose frequency is determined by the time constants of the multivibrator circuit.

The frequency of the sawtooth wave form generated by the multivibrator circuit may be controlled over a limited range by the moving of the slider arm of resistor 29 along the voltage divider network formed by resistors 30 and 31. The resistors 29, 30, 31, 60, and 61 control the rate of discharge of the capacitor 24 and, therefore, the time interval required for the capacitor to charge and discharge to the voltage levels which cause tube 11′ to become conducting and nonconducting. Stated another way, the period of the sawtooth wave is set by the RC time constant circuit, formed by capacitor 24 and resistors 29, 30, 31, 60, and 61 in the grid circuit of tube 11′.

Figure 2A:
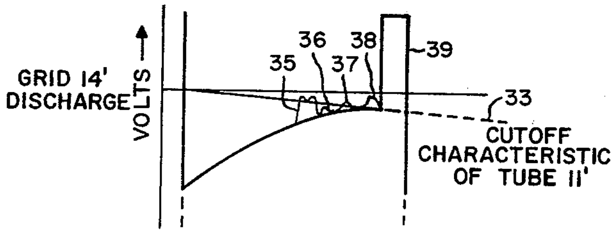

FIG. 2*a* shows the grid discharge voltage wave form at the junction of capacitor 24, grid 14′, and resistor 29. The sloping line 33 represents the cutoff characteristic of the tube 11′, i.e., when the voltage present on the grid 14′ goes above line 33, tube 11′ conducts and, when the grid voltage is below line 33, the tube is cut off. When the voltage on grid 14′ of tube 11′ goes above the cutoff line 33, the tube 11′ starts to conduct, and the cycle of operation previously described for the multivibrator begins to occur. The cutoff characteristic 33 of the tube 11′ is varied by many factors. Among these are the changes in the supply voltage of the circuit, aging of the tube, changes in the values of circuit components due to heat and aging, etc. These factors change the cutoff characteristic of the tube and, therefore, the frequency at which the multivibrator operates. This, in turn, changes the frequency of the sawtooth wave produced across the output capacitor 27 which causes the receiver to lose synchronism with the transmitted picture.

As is well known, in order to run the sweep circuits of the television receiver in synchronism with the transmitted picture, sync pulses are transmitted with the video signal which are used to synchronize the multivibrator. These synchronizing pulses are separated out from the video signal by suitable circuits (not shown) and appear as negative pulses at the grid 14 of tube 11. The negative-going sync pulse is inverted and amplified in tube 11 and applied through capacitor 24 to the grid 14′ of tube 11′. The positive sync pulse which appears at the grid 14′ serves to synchronize the frequency of the multivibrator to the frequency of the sync pulses.

However, if it is not desired to synchronize the multivibrator directly from the synchronizing pulses, the grid 14 of tube 11 may be supplied with a correction voltage from a phase detector circuit (not shown). The correction voltage changes the frequency of the multivibrator by varying the point at which tube 11 conducts. Phase detector circuits are well known and, in general, they compare the sync pulses of the received signal with a sample of the signal produced by the horizontal oscillator. When the frequencies of the two signals are equal, no output voltage is produced and the frequency of the multivibrator remains constant. When the two signals differ in frequency, a voltage is supplied to the grid 14 of tube 11, which accordingly speeds up or slows down the frequency of the multivibrator.

As previously explained, if the characteristics of the tubes 11—11′ change or if the circuit parameters of the tube change, the grid discharge wave form for the grid 14′ may operate the multivibrator in a manner such that it will not be synchronized by the sync pulses. For example, assume that the tube characteristics and circuit parameters were such as to affect the tube cutoff characteristic, so that the grid discharge wave form crossed the cutoff line, going in a positive direction, before the sync pulse arrived at the grid 14′. This would make tube 11′ of the multivibrator go into conduction before the occurrence of the sync pulse.

Another disadvantage of the directly synchronized sawtooth generator is the fact that noise signals, if present, can trigger off the oscillator. This is particularly true if the noise signals are of high amplitude and occur at a repetitive sequence at time intervals spaced near to the normal conduction time of the oscillator. For example, the noise pulses 35, 37, and 38 of FIG. 2*a* would be effective to drive tube 11' into conduction ahead of its normal time, the normal time being the period of the rectangular portion 39 of the wave, during which the sync pulse would occur. The noise pulses 35, 37, and 38 would trigger the tube 11', since each of these noise pulses, when riding on the grid discharge curve, extends above the cutoff characteristic line 33 of tube 11'.

When tube 11' is caused to discharge prior to its normal synchronized time, the retrace of the particular line of the picture being generated occurs before it normally should and the start of the trace of the next line is early. Consequently, the picture information of this line is displaced with respect to the picture information of the previous line. If the noise continues as the picture is scanned, line after line, the lines of the picture are displaced with respect to one another, causing the picture to "tear-out." As shown in FIG. 2*a*, the noise pulse 36, whose amplitude does not extend above the cutoff characteristic line 33 of the tube 11', does not cause the tube to conduct.

Referring again to FIG. 1, the sawtooth wave produced across capacitor 27 is supplied through a capacitor 40 to the grid electrode 42 of a horizontal output tube 44. The anode electrode 46 of the horizontal output tube 44 is connected to a high voltage transformer 48, one end of which is connected to a high voltage rectifier (not shown) which is used to supply high voltage to the cathode-ray tube in a well-known manner.

Connected across a portion of the transformer 48 are the horizontal deflection coils 50 and 50'. These coils serve to deflect the beam of the cathode-ray tube across the screen upon the application of the appropriate current wave to the coils. While compensation networks to obtain proper linearity of the sweep are not shown, it should be realized that these networks could be provided if desired.

A diode damper tube 53 is directed across the deflection coils 50 and 50'. In general, the diode 53 conducts only during the trace portion of the horizontal sweep to control the current flowing through the deflection coils 50—50'.

Figure 2B:
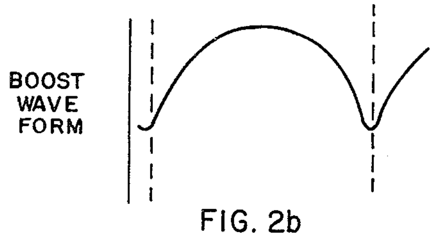

A boost capacitor 55 is connected between the anode of the damper tube 53 and the deflection coils 50—50'. There exists across the boost capacitor 55 a voltage having a wave shape that is basically a series of parabolic curves and is shown in FIG. 2*b*. It should be noted that although the wave form across the boost capacitor 55 is not sinusoidal in form it is, nevertheless, periodic and is in step with the periodic operation of the sweep circuits.

Figure 2C:
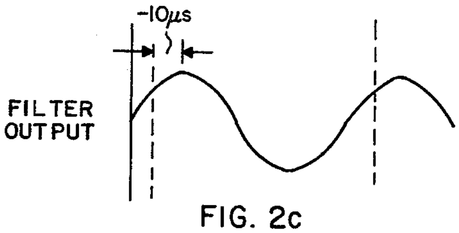

The parabolic voltage of FIG. 2*b* from boost capacitor 55 is coupled to a filter network consisting of capacitors 57 and 58 and coil 59. The output terminal of the filter network is coupled through resistor 61 to ground and through resistor 60 to control grid 14'. The values of capacitors 57 and 58 and coil 59 are preferably chosen to pass a harmonic frequency component of the parabolic voltage from boost capacitor 55. In one preferred embodiment of the invention, the inductance of coil 59 is adjusted so that the fundamental frequency component is translated and added to the grid 14' discharge voltage. The output of the filter network is shown in FIG. 2*c*.

Figure 2D:
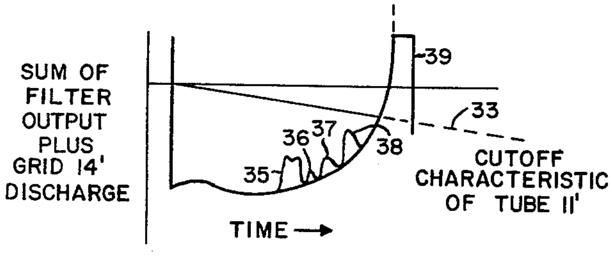

The resultant voltage wave form now appearing on grid 14' of tube 11' is shown in FIG. 2*d*. This wave form is the sum of the output voltage of the filter plus the original grid discharge voltage. The net result at the grid 14' of tube 11' is to produce a voltage having a wave form which crosses the cutoff characteristic line 33 of the tube at substantially right angles. The steep slope of the grid discharge curve of FIG. 2*d* makes the tube relatively insensitive to changes in circuit parameters, supply voltage, and the aging of the tube because, due to the steep slope of the grid discharge curve, it would take a relatively large change of these factors in order to change the frequency of the multivibrator, i.e., to shift the grid discharge voltage wave form to a place where it would cross the cutoff line before or after the proper time. It can also be seen in the case of direct sync pulse synchronization that if noise pulses are riding on this composite wave form appearing at the grid 14', their amplitude would have to be substantially higher than the noise pulses 35–38 shown in FIG. 2*a* in order to cause the tube 11' to conduct.

FIG. 3 shows the principles of the invention as applied to a blocking tube oscillator circuit which is used to generate the sawtooth waves. In FIG. 3, a blocking tube oscillator 70 and a discharge tube 72 are provided. In accordance with the operation of the circuit of FIG. 3, as the grid 73 of the blocking oscillator tube 70 goes positive, the plate current of tube 70 increases and the plate voltage decreases. The decrease in plate voltage across the primary winding of transformer 75 is inverted across the secondary winding. The inverted voltage is supplied to the grid 73 through a capacitor 76 to reinforce the positive swing of the grid potential on the grid 73.

The grid 73 rapidly saturates and a point is reached where there is no more positive voltage being supplied to the grid 73 from the transformer 75. At this point, the grid voltage begins to slide back as the capacitor 76 discharges through resistors 77 and 78, thereby causing the plate current of tube 70 to decrease and plate voltage to increase. The increase of plate voltage at the plate of the tube 70 is inverted through the transformer 75 and supplied to the grid 73, causing the tube 70 to go towards cutoff. The grid 73 is now driven well beyond cutoff by the sudden increase in plate voltage of tube 70.

As a result of the original positive feedback and the grid current flow, a large negative charge is present on capacitor 76 which starts to leak off through resistors 77 and 78 when tube 70 is cut off. As the capacitor 76 discharges, the discharging current through resistors 77 and 78 decreases until the grid reaches level at which the tube again starts to conduct. The time constant of the blocking oscillator is controlled by the time constant of capacitor 76 and resistors 77 and 78. When tube 70 is cut off, a capacitor 80 in the plate circuit of the tube 70 charges toward B+ through a resistor 81. This capacitor discharges when tube 80 conducts and, in this manner, the sawtooth wave is generated.

FIG. 3*a* shows the wave form which is normally present at the grid 73 of the blocking oscillator. This wave form is similar to the wave form shown in FIG. 2*a* which is present at the grid of the tube 11' of the multivibrator circuit and, consequently, blocking oscillator susceptible to the same causes of instability. In order to overcome this, the boost voltage wave form is added to the grid 73 of the blocking oscillator tube 70 in the manner described with respect to FIG. 1. This composite wave form, with its steep slope, crossing the tube 70 cutoff characteristic line 33 at substantially right angles, renders the blocking oscillator 70 more stable and relatively insensitive to noise pulses and changes in circuit parameters.

In some applications, the sawtooth which is generated across the capacitor 80 cannot be used for sweep purposes. In many cases, a discharge tube 72 is used to generate the sawtooth which is actually used. The grid of the discharge tube is directly connected to the grid 73 of the blocking oscillator tube 70 and, therefore, the same wave form shown in FIG. 3*b* is applied to the grid of tube 72. A capacitor 84 is connected from the plate of the discharge tube 72 to ground 20 and a sawtooth wave is generated across capacitor 84 in the manner previously described. Since the tube 72 receives the same wave form at the grid shown in FIG. 3*b*, this tube also has greater stability and is insensitive to circuit parameter variations and to noise pulses.

A circuit for the improvement of the stability of multivibrator and blocking oscillator circuits has been shown. This circuit has particular utility in horizontal oscillator circuits of television receivers where the voltage wave form produced across the boost capacitor of the damper tube circuit may be utilized to energize the resonant circuit in the oscillator, thereby to shape the voltage wave form applied to the grid of the blocking oscillator or multivibrator tubes.

While there has been described what is, at present, considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A stable sweep-signal generating circuit in a television receiver comprising: a sawtooth oscillator to be controlled by a predetermined portion of a control signal; a damper circuit including a boost capacitor across which is developed a signal in the form of a repetitive series of parabolic waves; and means for modifying said control signal to reduce the possibility that the oscillator will be undesirably controlled by a portion of the control signal other than said predetermined portion by supplying the boost capacitor signal to said oscillator for improving the stability of the oscillator against noise and component drift.

2. A stable sweep-signal generating circuit in a television receiver comprising: a sawtooth oscillator to be triggered by a predetermined portion of a control signal which may also be undesirably triggered by other portions of said control signal which exceed a cutoff characteristic of the oscillator; a damper circuit including a boost capacitor across which is developed a signal in the form of a repetitive series of parabolic waves; and means for modifying said control signal to reduce the possibility that the oscillator will be undesirably controlled by a portion of the control signal other than said predetermined portion by adding the boost capacitor signal to the control signal in said oscillator and forming a composite signal which crosses the cutoff characteristic of the oscillator with a steep slope to prevent portions of the control signal other than said desired portion from triggering the oscillator, whereby oscillator stability is improved.

3. A stable sweep-signal generating circuit for a television receiver comprising: a sawtooth oscillator to be triggered by a control voltage when said voltage exceeds a cutoff characteristic curve of the oscillator; a damper circuit including a boost capacitor across which is developed a voltage in the form of a repetitive series of parabolic waves; and means for adding the fundamental component of the boost capacitor voltage to the control voltage in said sawtooth oscillator to improve the stability of the oscillator against noise and component drift by forming a composite voltage which crosses the cutoff characteristic curve with a steep slope.

4. A stable horizontal sweep-signal generating circuit for a television receiver comprising: a horizontal sawtooth oscillator to be triggered by a control voltage when said voltage exceeds a cutoff characteristic curve of the oscillator; a damper circuit driven by an output of the oscillator and including a boost capacitor across which is developed a voltage in the form of a repetitive series of parabolic waves; and means for adding the fundamental component of the boost capacitor voltage to said sawtooth oscillator to improve the stability of the oscillator against noise and component drift by forming a composite voltage which is well below the cutoff characteristic curve until it is desired that the control voltage cross the characteristic curve whereupon it rises sharply.

5. In a horizontal deflection circuit for a television receiver wherein a periodic voltage consisting of a series of parabolic wave forms repetitive at line-scan frequency is developed in the output circuit thereof, a stabilized oscillator circuit comprising: oscillator circuit means for oscillating at a free-running frequency determined by a control voltage to be the same as said line-scan frequency; means including a boost capacitor for supplying said periodic voltage; and filter circuit means responsive to said supplied periodic voltage for selecting the fundamental frequency component of said periodic voltage at a predetermined phase relation and adding it to improve the stability of the oscillator circuit means against noise and component drift.

6. In a horizontal deflection circuit for a television receiver wherein a periodic voltage consisting of a repetitive series of parabolic wave forms is developed in the output circuit thereof, a stabilized oscillator circuit comprising: oscillator circuit means for oscillating at a free-running frequency determined by the intersection of a control voltage developed therein with an operating characteristic of the oscillator circuit means; means for supplying said periodic voltage; and circuit means responsive to said supplied periodic voltage for adding a harmonic thereof to the control voltage to increase the angle of intersection, thereby improving the oscillator circuit means against noise and component drift.

7. In a horizontal deflection circuit for a television receiver wherein a periodic voltage consisting of a repetitive series of parabolic wave forms is developed in the output circuit thereof, a stabilized oscillator circuit comprising: oscillator circuit means including a multivibrator circuit with a control grid for oscillating at a free-running frequency determined by a control voltage on said control grid; means including a boost capacitor in said output circuit for supplying said periodic voltage; and filter circuit means coupled from said boost capacitor to said control grid and being responsive to said supplied periodic voltage for wave-shaping the control voltage with a harmonic of the periodic voltage to improve the stability of the oscillator circuit means against noise and component drift.

8. In a horizontal deflection circuit for a television receiver wherein a periodic voltage consisting of a repetitive series of parabolic wave forms is developed in the output circuit thereof, a stabilized oscillator circuit comprising: oscillator circuit means including a multivibrator circuit with a control grid for oscillating at a free-running frequency determined by a control voltage on said control grid; means including a boost capacitor in said output circuit for supplying said periodic voltage; and filter circuit means coupled from said boost capacitor to said control grid and being responsive to said supplied periodic voltage for wave-shaping the control voltage with a fundamental frequency component of the periodic voltage to improve the stability of the oscillator circuit means against noise and component drift.

9. In a horizontal deflection circuit for a television receiver wherein a periodic voltage consisting of a repetitive series of parabolic wave forms is developed in the output circuit thereof, a stabilized oscillator circuit comprising: oscillator circuit means including a blocking oscillator with a control grid for oscillating at a free-running frequency determined by a control voltage on said control grid; means including a boost capacitor in said output circuit for supplying said periodic voltage; and filter circuit means coupled from said boost capacitor to said control grid and being responsive to said supplied periodic voltage for wave-shaping the control voltage with a harmonic of the periodic voltage to improve the stability of the oscillator circuit means against noise and component drift.

10. In a horizontal deflection circuit for a television receiver wherein a periodic voltage consisting of a repetitive series of parabolic wave forms is developed in the output circuit thereof; a stabilized oscillator circuit comprising: oscillator circuit means including a blocking oscillator with a control grid for oscillating at a free-running frequency determined by a control voltage on said control grid; means including a boost capacitor in said output circuit for supplying said periodic voltage; and filter circuit means coupled from said boost capacitor to said control grid and being responsive to said supplied periodic voltage for wave-shaping the control voltage with a fundamental frequency component of the periodic voltage to improve the stability of the oscillator circuit means against noise and component drift.

References Cited by the Examiner

UNITED STATES PATENTS

| | | | |
|---|---|---|---|
| 2,461,871 | 2/49 | Bass | 331—20 |
| 2,564,588 | 8/51 | Wendt | 331—26 |
| 2,764,681 | 9/56 | Howell | 331—26 |

FOREIGN PATENTS

| | | |
|---|---|---|
| 761,900 | 11/56 | Great Britain. |

JOHN W. HUCKERT, *Primary Examiner.*

GEORGE N. WESTBY, ARTHUR GAUSS, *Examiners.*